US010059468B1

(12) United States Patent
Judd et al.

(10) Patent No.: US 10,059,468 B1
(45) Date of Patent: Aug. 28, 2018

(54) SPACE VEHICLE CHASSIS

(71) Applicant: Los Alamos National Security, LLC, Los Alamos, NM (US)

(72) Inventors: Stephen Judd, Los Alamos, NM (US); Nicholas Dallmann, Los Alamos, NM (US); Daniel Seitz, Los Alamos, NM (US); John Martinez, Los Alamos, NM (US); Steven Storms, Los Alamos, NM (US); Gayle Kestell, Los Alamos, NM (US)

(73) Assignee: Los Alamos National Security, LLC, Los Alamos, NM (US)

( * ) Notice: Subject to any disclaimer, the term of this patent is extended or adjusted under 35 U.S.C. 154(b) by 69 days.

(21) Appl. No.: 15/612,534

(22) Filed: Jun. 2, 2017

Related U.S. Application Data

(63) Continuation of application No. 14/745,698, filed on Jun. 22, 2015.

(60) Provisional application No. 62/016,543, filed on Jun. 24, 2014.

(51) Int. Cl.
| B64G 1/00 | (2006.01) |
| B64G 1/10 | (2006.01) |
| B64G 1/36 | (2006.01) |
| B64G 1/42 | (2006.01) |
| B64G 1/50 | (2006.01) |
| B64G 1/54 | (2006.01) |
| B64G 1/66 | (2006.01) |
| B64G 1/44 | (2006.01) |

(52) U.S. Cl.
CPC ............... *B64G 1/10* (2013.01); *B64G 1/363* (2013.01); *B64G 1/42* (2013.01); *B64G 1/44* (2013.01); *B64G 1/503* (2013.01); *B64G 1/54* (2013.01); *B64G 1/66* (2013.01); *B64G 2001/1092* (2013.01)

(58) Field of Classification Search
CPC . B64G 1/10; B64G 1/1078; B64G 2001/1092
See application file for complete search history.

(56) References Cited

U.S. PATENT DOCUMENTS

| 5,779,195 A | 7/1998 | Basuthakur et al. |
| 5,787,969 A | 8/1998 | Drolen et al. |
| 5,794,890 A | 8/1998 | Jones et al. |

(Continued)

OTHER PUBLICATIONS

Non-final Office Action issued in U.S. Appl. No. 14/745,698 dated Jan. 6, 2017.

(Continued)

*Primary Examiner* — Richard G Davis
(74) *Attorney, Agent, or Firm* — LeonardPatel PC; Michael Aristo Leonard, II; Sheetal Suresh Patel

(57) ABSTRACT

A modular space vehicle chassis may facilitate convenient access to internal components of the space vehicle. Each module may be removable from the others such that each module may be worked on individually. Multiple panels of at least one of the modules may swing open or otherwise be removable, exposing large portions of the internal components of the space vehicle. Such chassis architectures may reduce the time required for and difficulty of performing maintenance or modifications, may allow multiple space vehicles to take advantage of a common chassis design, and may further allow for highly customizable space vehicles.

18 Claims, 5 Drawing Sheets

(56) References Cited

U.S. PATENT DOCUMENTS

| | | | | |
|---|---|---|---|---|
| 5,806,800 | A * | 9/1998 | Caplin | B64G 1/503 165/41 |
| 5,839,696 | A | 11/1998 | Caplin et al. | |
| 6,206,327 | B1 * | 3/2001 | Benedetti | B64G 1/10 244/159.4 |
| 6,293,499 | B1 * | 9/2001 | MacGillivray | B64G 1/10 244/159.5 |
| 6,568,638 | B1 * | 5/2003 | Capots | B64G 1/10 244/159.4 |
| 7,513,462 | B1 * | 4/2009 | McKinnon | B64G 1/1007 244/173.1 |
| 2006/0058023 | A1 * | 3/2006 | White | B64G 7/00 455/427 |
| 2006/0185277 | A1 * | 8/2006 | Quincieu | B64G 1/10 52/265 |
| 2011/0278399 | A1 | 11/2011 | Takahashi et al. | |
| 2011/0296675 | A1 * | 12/2011 | Roopnarine | B64G 1/10 29/700 |
| 2012/0154585 | A1 * | 6/2012 | Miranda | B64G 1/1021 348/144 |
| 2014/0039729 | A1 * | 2/2014 | Puig-Suari | B64G 1/66 701/3 |
| 2014/0042275 | A1 * | 2/2014 | Abrams | B64G 1/222 244/172.6 |
| 2014/0097981 | A1 * | 4/2014 | Celerier | B64G 1/1007 342/352 |
| 2014/0263844 | A1 | 9/2014 | Cook et al. | |
| 2016/0205814 | A1 | 7/2016 | Burke | |

OTHER PUBLICATIONS

Notice of Allowance issued in U.S. Appl. No. 14/745,698 dated Mar. 20, 2017.

Richard G. Davis, "Restriction Requirement", dated Oct. 12, 2016 for U.S. Appl. No. 14/745,698.

Space Micro MSS-01,02 Medium Sun Sensors Brochure, http://www.spacemicro.com/assets/datasheets/guidance-and-nav/MSS.pdf (May 2, 2014).

Wikipedia ESTCube-1 Page, http://en.wikipedia.org/wiki/ESTCube-1 (last accessed Apr. 24, 2014).

Hung Q. Dang, "Final Office Action", dated Sep. 21, 2017, U.S. Appl. No. 14/745,810.

Hung Q. Dang, "Non-Final Office Action", dated Apr. 24, 2017 for U.S. Appl. No. 14/745,810.

Hung Q. Dang, "Notice of Allowance", dated Mar. 26, 2018, U.S. Appl. No. 14/745,810.

Supplemental final Office Action issued in U.S. Appl. No. 14/745,810 dated Dec. 26, 2017.

* cited by examiner

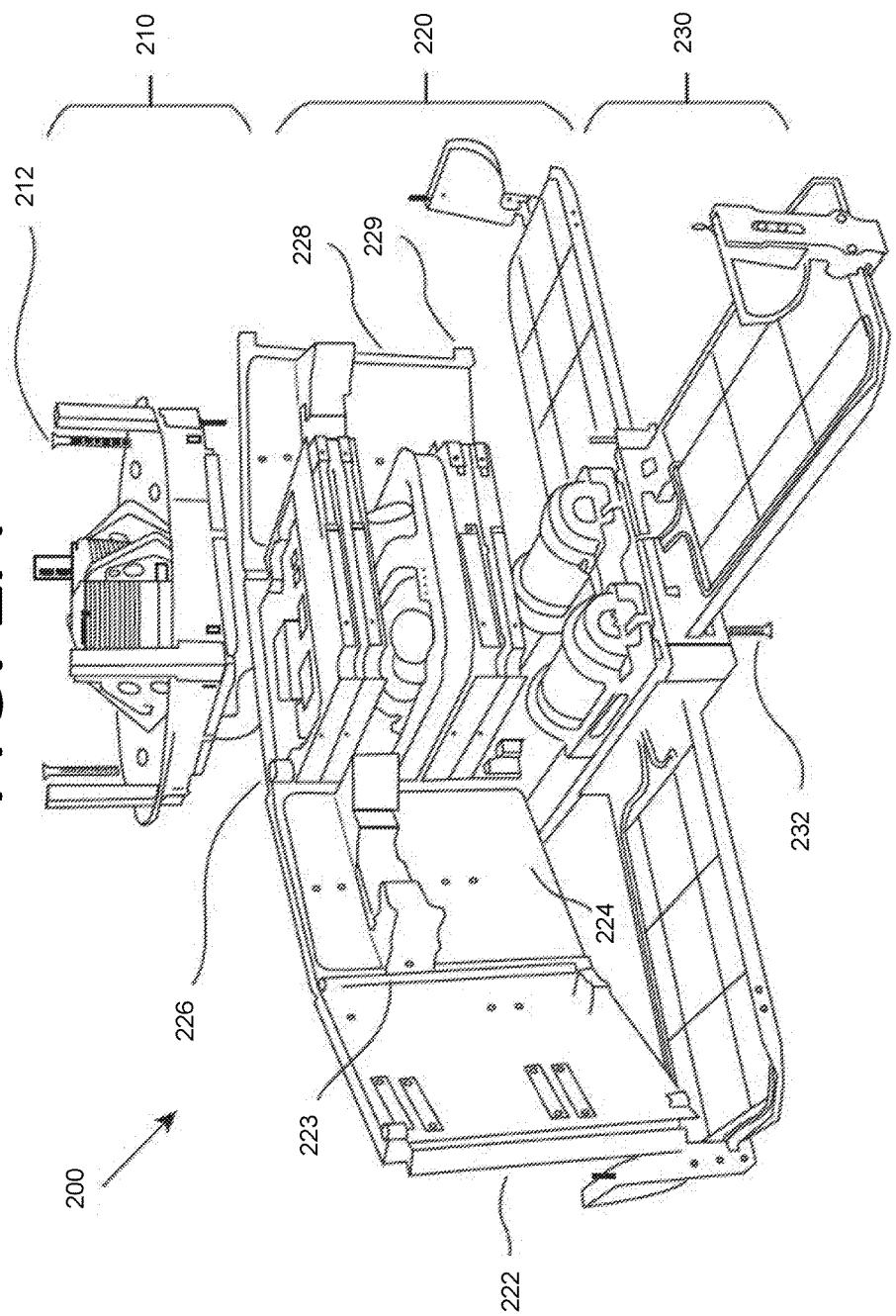

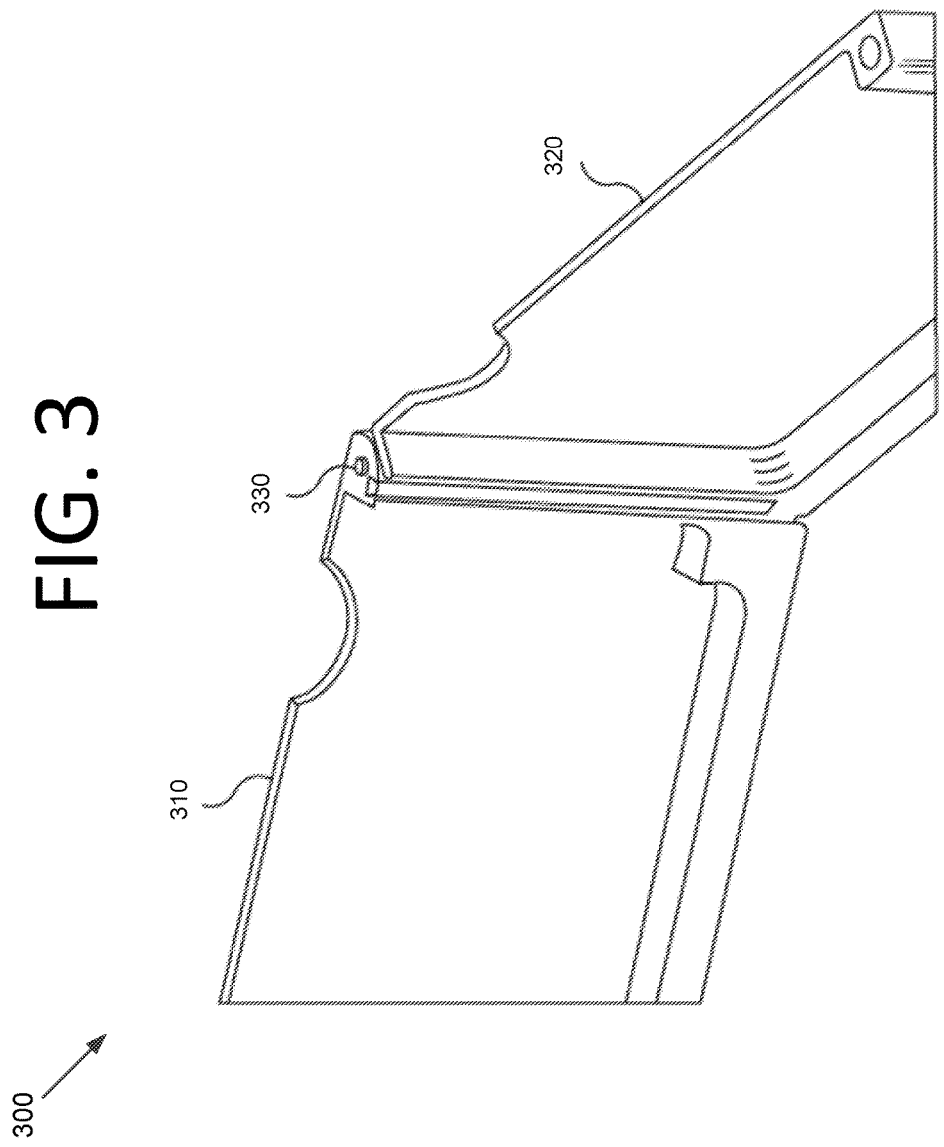

SPACE VEHICLE CHASSIS

CROSS REFERENCE TO RELATED APPLICATION

This application is a continuation of U.S. patent application Ser. No. 14/745,698 filed Jun. 22, 2015, which claims the benefit of U.S. Provisional Patent Application No. 62/016,543 filed on Jun. 24, 2014. The subject matter of these earlier filed applications is hereby incorporated by reference in its entirety.

STATEMENT OF FEDERAL RIGHTS

The United States government has rights in this invention pursuant to Contract No. DE-AC52-06NA25396 between the United States Department of Energy and Los Alamos National Security, LLC for the operation of Los Alamos National Laboratory.

FIELD

The present invention generally relates to space vehicles, and more particularly, to a chassis for space vehicles that facilitates convenient and effective access to space vehicle components.

BACKGROUND

Conventional satellite chassis include one or more access doors to access internal components. However, such conventional satellite chassis, including those of cubesats and other satellites, tend not to provide convenient access to these internal components. Rather, it is typically necessary for an engineer or scientist to put on rubber gloves and dig into the core components of the vehicle to access a given component, which is cumbersome and time consuming. Accordingly, an improved space vehicle chassis architecture may be beneficial.

SUMMARY

Certain embodiments of the present invention may provide solutions to the problems and needs in the art that have not yet been fully identified, appreciated, or solved by conventional space vehicle chassis. For example, some embodiments of the present invention pertain to a convenient, modular space vehicle chassis that is configured to be separated, facilitating easy access to internal space vehicle components.

In an embodiment, an apparatus includes a plurality of panels covering respective sides of a space vehicle. At least one of the plurality of panels is connected to another panel of the plurality of panels, one or more internal components of the space vehicle, or both, such that the at least one panel of the plurality of panels opens away from the one or more internal components of the space vehicle, allowing access to internal components on a respective side of the space vehicle.

In another embodiment, an apparatus includes a plurality of modules. Each module of the plurality of modules is connected to at least one other module of the plurality of modules. Each module can be removed from the other modules of the plurality of modules so components of the removed module may be worked on without disturbing components of the other modules.

In yet another embodiment, a space vehicle includes top module, a center module, and a bottom module. The top module is connected to the center module and the center module is connected to the bottom module. Each module can be removed from the other modules so components of the removed module can be worked on without disturbing components of the other modules.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIG. 2A is an exploded perspective view illustrating a cubesat with an opened center module, according to an embodiment of the present invention.

FIG. 3 is a perspective view illustrating panels connected by a hinge, according to an embodiment of the present invention.

DETAILED DESCRIPTION OF THE EMBODIMENTS

Some embodiments of the present invention pertain to a space vehicle chassis that facilitates convenient access to internal components. Multiple panels of the chassis may swing open or otherwise be removable, exposing large portions of internal components. Such chassis architectures may reduce time required for and difficulty of performing maintenance or modifications, may allow multiple space vehicles to take advantage of a common chassis design, and may further allow for highly customizable space vehicles. The architecture may also be modular, such that modules can be removed from one another. In conventional satellites, the bus and instrument package are separate and relatively difficult to access. Furthermore, many satellites do not even use panels, instead having doors in the chassis of the satellite. This is one of the reasons that conventional satellites are so expensive. Embodiments of the present invention may be applied to cubesats, be extended to, and used for, satellites of any size and payload, or used for other space vehicles. In other words, at least some of the embodiments discussed herein may be scaled to satellites of any size.

Figure 1:
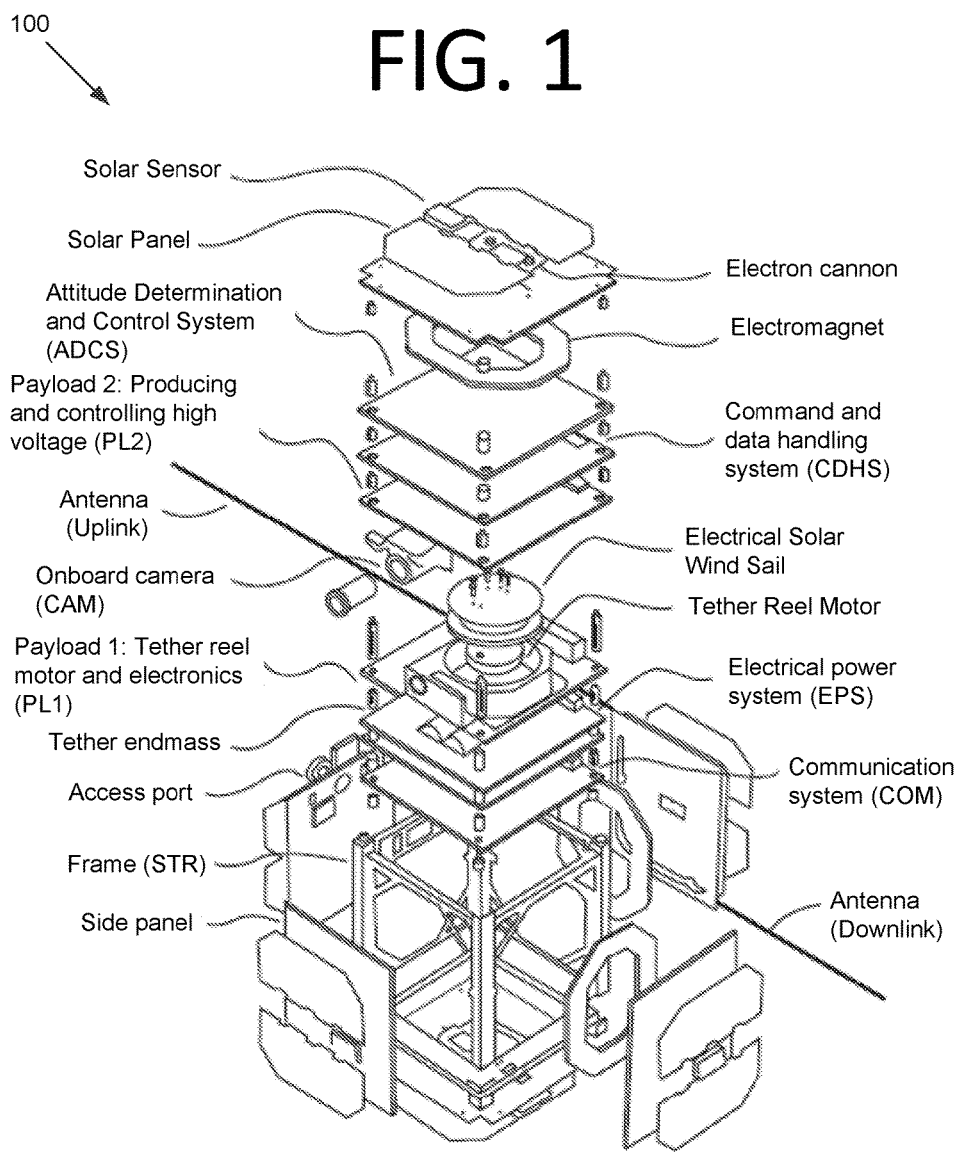
FIG. 1 is an exploded perspective view illustrating a cubesat.

Some of the issues with conventional cubesat chassis designs can be seen in cubesat 100 of FIG. 1. This architecture is typical of the majority of conventional cubesat designs. The chassis is a cage-type structure. Circuit boards are stacked together and then bolted into the cage. Solar panels are bolted to the outside of the cage, and then must be connected to the power board. Assembly is difficult and time consuming. Testing boards inside the satellite is not possible without removing a solar panel, which now "breaks" a critical piece of the satellite that was previously working. Boards cannot be tested in-situ, i.e., the system components cannot be tested when fully assembled. To replace a board, the entire satellite must be disassembled.

Assembly, testing, and repair of conventional satellites is a difficult, high-risk task due to this design. This also greatly increases development time, which is precious, especially with cubesats. It is far more desirable to spend time testing, not assembling and disassembling the satellite. Furthermore, it is desirable not to have to touch any component other than a broken component, and disassembling working components increases the chance of failure of those components. For instance, if the solar panels must be disconnected to test or replace a radio board, then the risk of satellite failure increases due to potentially breaking the power system, even though the problem was in the radio.

Embodiments of the present invention facilitate simplified assembly and testing of space vehicles compared with conventional designs. More specifically, some embodiments of the chassis are designed as modules. For instance, a satellite may be separated into three separate modules in some embodiments: a radio/antenna module, a digital module, and a power module. However, any number of modules with any desired purpose may be used in other embodiments. Furthermore, the modules may be assembled in any location and order, as desired for the given mission.

These modules may plug into one another via robust connectors and mechanical alignment features built into the structure. In some embodiments, Omnetics Nanolobe™ connectors may be used with custom pin inserts for the power board, although any suitable connector may be used as a matter of design choice. Mechanical alignment features may include guide pins (e.g., guide pins 212, 232 visible in the top and bottom corners of FIG. 2A for the top and bottom modules, respectively) and mechanical fasteners (holes, screws, etc.).

Each module may be worked on separately. For instance, if there is a problem in the power module, that module can be removed and either be repaired or replaced without touching the rest of the space vehicle. A modular design facilitates simplified assembly and disassembly (modules may assemble and plug in together), improved reliability, and the ability to test and/or repair components of the space vehicle without disassembling the entire vehicle.

FIG. 2A illustrates an exploded perspective view of a cubesat satellite 200 with an opened center module 220, according to an embodiment of the present invention. A top module 210 includes the antenna and housing for radio frequency equipment. A bottom module (i.e., power module) 230 includes the batteries, solar panels, charging circuitry, and power supplies for cubesat 200. Guide pins 212, 232 mechanically align top module 210 and bottom module 230, respectively.

Center module 220 includes four panels 222, 224, 226, 228 that open to reveal components housed within. More specifically, in this embodiment, center module 220 houses the attitude determination and control system (ADCS), digital circuit boards, sun sensor, and ballast mass, among other components. Modules 210, 220, 230 plug into one another via connectors, providing a more reliable mechanical and electrical interface than using cables and wiring harnesses. This modular design is unique and not found in conventional space vehicles.

Internal components encased by center module 220 may also employ a modular design, with circuit boards plugged into the backplane and encased by panels 222, 224, 226, 228. Panels 222, 224, 226, 228 may also provide radiation shielding, thermal control (i.e., radiating) surfaces, and thermal mass. This is not the case with conventional cubesats. In fact, the interior of many conventional cubesats is exposed to space, which may lead to damage to, or failure of, internal electronics.

Panel 222 includes open slots for accessing debugging connectors on individual circuit boards, panel 224 includes attached ballast masses for center of gravity symmetry, panel 226 attaches to the backplane, and panel 228 includes an attached sun sensor. However, the shape and configuration of each panel is a matter of design choice, as well as what components attach to, or are housed by, the respective panel. In other embodiments, the panels of center module 220 may form other polygonal shapes, irregular shapes, or any other shape as a matter of design choice provided at least one panel can be opened to expose components that it may be desirable to access.

Figure 2B:
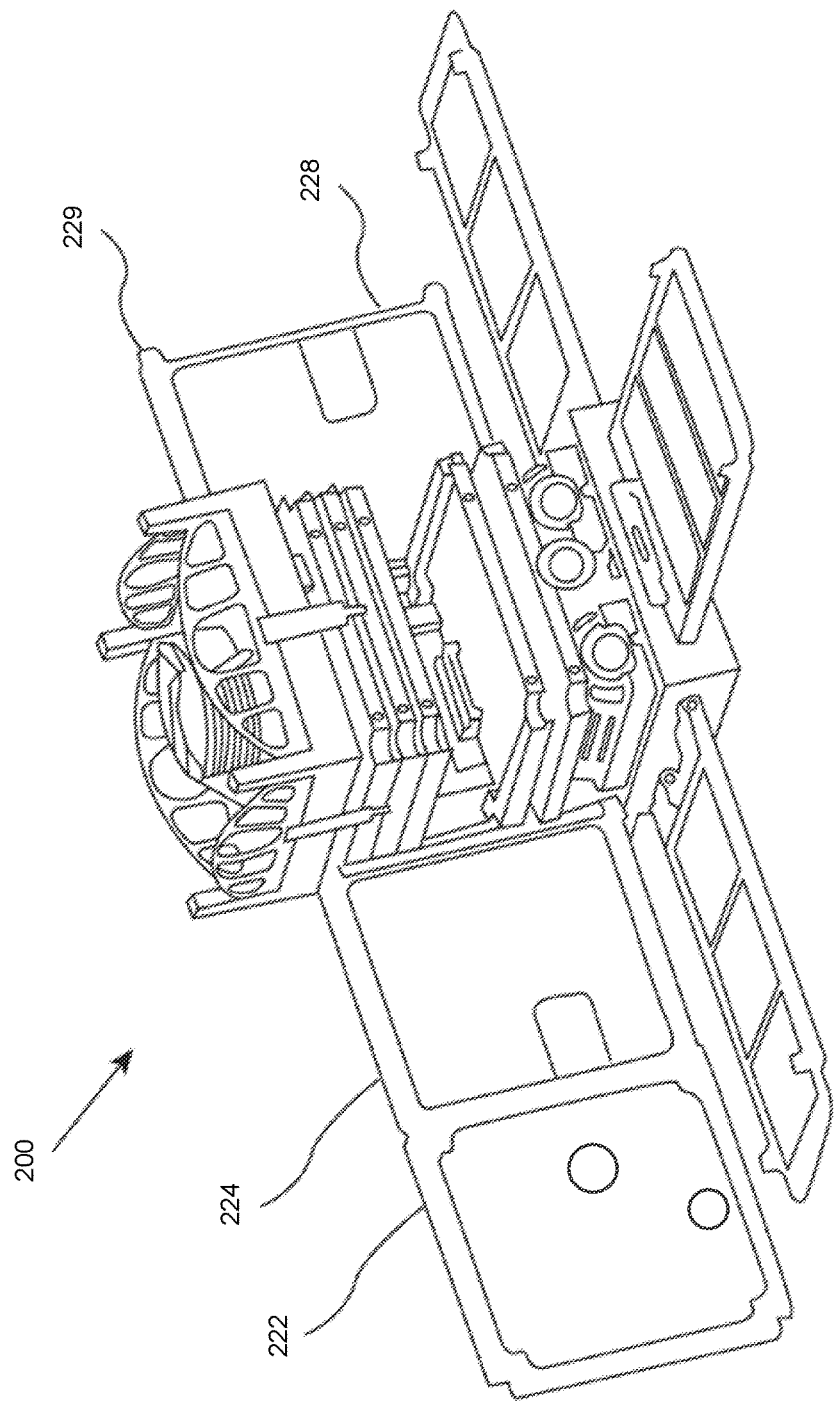
FIG. 2B is an assembled perspective view illustrating the cubesat of FIG. 2A with an opened center module, according to an embodiment of the present invention.

FIG. 2B illustrates an assembled perspective view of cubesat 200 with an opened center module 220, according to an embodiment of the present invention. Per the above, center module 220 includes three visible panels 222, 224, 228, as well as panel 226 behind the backplane that is not visible in this view. In this embodiment, each panel is connected to one or two adjacent panels via hinges. See FIGS. 3 and 4. For instance, panel 222 is connected to panel 224, panel 224 is connected to panels 222 and 226, panel 226 is connected to panels 224 and 228, and panel 228 is connected to panel 226.

When closed, panel 222 covers the front of cubesat 200, panel 224 covers the left side of cubesat 200, and panel 228 covers the right side of cubesat 200. Per the above, panel 222 has slots that provide access to data ports in circuit boards of cubesat 200, allowing testing of cubesat 200 without opening panels 222, 224, 228. In this embodiment, panel 226 is attached to the backplane and does not open. When opened, panels 222, 224, 228 fully expose the circuit boards of cubesat 200. Unfolding panels 222, 224, 228 provides extra convenience for testing and repair. Furthermore, temperature sensors, sun sensors, ballast masses, and other components may be accessed without disturbing the circuit boards. In this manner, center module 220 permits unprecedented access to components that is not possible with conventional space vehicles. Additionally, the corners of center module 220 may be configured to slide along rails of a cubesat dispenser (not shown) for easy deployment when cubesat 200 reaches space.

Additional benefits may be realized by employing a center module with panels similar to that shown in FIGS. 2A and 2B. For instance, solid panels are relatively easy and inexpensive to manufacture. Per the above, solid panels may also provide radiation shielding, thermal mass, and thermal control surfaces. For panels 222, 224, 226, 228, dowel pins 223 may be used to attach adjacent panels. Dowel pins 223 may fit in holes in tabs 229 at the corners of panels 222, 224, 226, 228.

FIG. 3 is a perspective view 300 illustrating panels 310, 320 connected by a hinge 330, according to an embodiment of the present invention. Hinge 330 may be a rod placed through holes in loops in panels 310, 320, a spring, a bolt, or any other suitable hinge mechanism that allows panels 310, 320 to move with respect to one another. Other panels may be connected to another side of one or both of panels 310, 320 via respective hinges as well. In other embodiments, instead of hinges, panels may be connected to one another via screws or any other connector. In certain embodiments, one or more panels may not be connected to other panels at all, but instead may be connected to internal components of the space vehicle.

Figure 4:
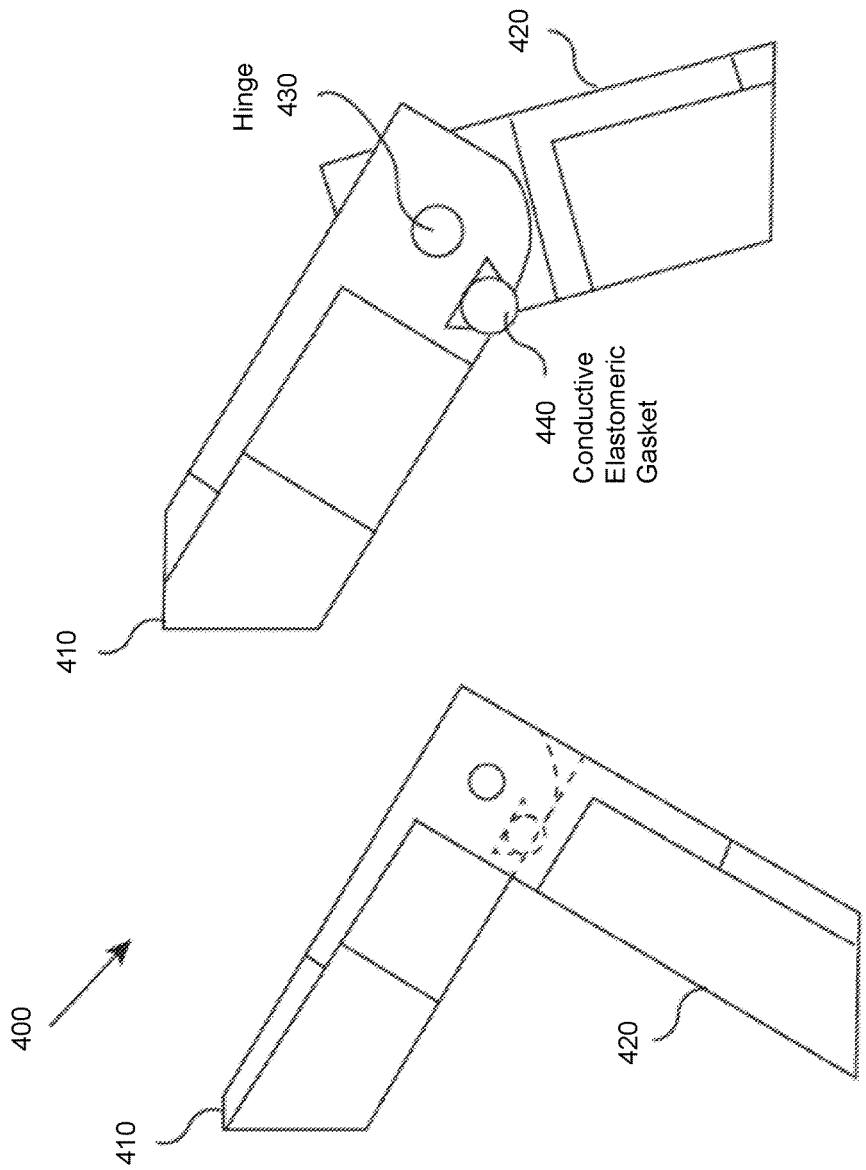
FIG. 4 is a top view illustrating panels connected by a hinge, according to an embodiment of the present invention.

FIG. 4 is a top view 400 of panels 410, 420 connected by a hinge 430, according to an embodiment of the present invention. A conductive elastomer gasket 440 mitigates against radio frequency (RF) emissions. Hinge 430 allows panels 410, 420 to swing away from one another. The corner of panels 410, 420 forms a right angle when closed in this embodiment. However, any desired angle may be achieved in other embodiments, depending on the components and design.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. An apparatus, comprising:
   a backplane; and
   a plurality of modules comprising internal components, wherein
   each module of the plurality of modules is configured to connect to at least one other module of the plurality of modules
   a module of the plurality of modules comprises a plurality of panels,
   one panel is connected to the backplane, and
   the other panels of the plurality of panels open to expose at least three sides of the one or more internal components of the module comprising the plurality of panels.

2. The apparatus of claim 1, wherein the apparatus is a space vehicle.

3. The apparatus of claim 1, wherein each module of the plurality of modules plugs into at least one other module of the plurality of modules via respective connectors.

4. The apparatus of claim 1, wherein the apparatus comprises a top module, a bottom module, and a center module.

5. The apparatus of claim 4, wherein the top module is connected to the center module and the center module is connected to the bottom module.

6. The apparatus of claim 4, wherein the top module comprises an antenna and housing for radio frequency equipment, the bottom module comprises batteries, solar panels, charging circuitry, and at least one power supply, and the center module houses a backplane and circuit boards.

7. The apparatus of claim 4, wherein
   the center module comprises at least one panel that opens to expose internal components,
   one panel of the center module comprises open slots for accessing debugging connectors on individual circuit boards when the panel is closed,
   another panel of the center module comprises attached ballast masses for center of gravity symmetry, and
   yet another panel of the center module comprises an attached sun sensor.

8. The apparatus of claim 1, wherein
   at least one module of the plurality of modules comprises a plurality of panels, and
   at least one panel of the plurality of panels provides radiation shielding, thermal mass, and a thermal control surface.

9. The apparatus of claim 1, wherein each module plugs into at least one other module via at least one respective connector.

10. The apparatus of claim 1, wherein at least one module of the plurality of modules comprises a panel, the panel comprising a plurality of open slots to access debugging connectors on individual circuit boards when the panel is closed.

11. The apparatus of claim 1, wherein at least one module of the plurality of modules comprises a panel, the panel comprising attached ballast masses for center of gravity symmetry.

12. The apparatus of claim 11, wherein at least one module of the plurality of modules comprises a panel, the panel comprising a sun sensor.

13. A space vehicle, comprising:
   a top module, a center module, and a bottom module, wherein
   the top module is configured to connect to the center module and the center module is configured to connect to the bottom module, the center module comprises at least one panel that opens to expose internal components, one panel of the center module comprises open slots for accessing debugging connectors on individual circuit boards when the panel is closed, another panel of the center module comprises attached ballast masses for center of gravity symmetry, and yet another panel of the center module comprises an attached sun sensor.

14. The space vehicle of claim 13, wherein the top module comprises an antenna and housing for radio frequency equipment, the bottom module comprises batteries, solar panels, charging circuitry, and at least one power supply, and the center module houses a backplane and circuit boards.

15. The apace vehicle of claim 13, further comprising:
a backplane, wherein
the center module comprises a plurality of panels,
one panel is connected to the backplane, and
the other panels of the plurality of panels open to expose at least three sides of the one or more internal components of the center module.

16. An apparatus, comprising:
at least three of modules comprising internal components, wherein
each module of the plurality of modules is connected to at least one other module of the plurality of modules,
each module is configured to be removable from the other modules of the plurality of modules so components of the removed module are accessible without disturbing internal components of the other modules, one module of the plurality of modules comprises an antenna and housing for radio frequency equipment, another module of the plurality of modules comprises batteries, solar panels, charging circuitry, and at least one power supply, and yet another module of the plurality of modules houses a backplane and circuit boards.

17. The apparatus of claim 16, wherein
the at least three modules comprise a top module, a center module, and a bottom module,
the center module comprises at least one panel that opens to expose internal components,
one panel of the center module comprises open slots for accessing debugging connectors on individual circuit boards when the panel is closed,
another panel of the center module comprises attached ballast masses for center of gravity symmetry, and
yet another panel of the center module comprises an attached sun sensor.

18. The apparatus of claim 16, further comprising:
a backplane, wherein
a module of the plurality of modules comprises a plurality of panels,
one panel is connected to the backplane, and
the other panels of the plurality of panels open to expose at least three sides of the one or more internal components of the module comprising the plurality of panels.

* * * * *